United States Patent Office 3,761,263
Patented Sept. 25, 1973

3,761,263
DIAZOTYPE COMPOSITIONS AND
PHOTOGRAPHIC PROCESSES
James C. Fleming and Michael D. Shea, Rochester, N.Y.,
assignors to Eastman Kodak Company, Rochester, N.Y.
No Drawing. Filed Nov. 3, 1971, Ser. No. 195,466
Int. Cl. G03c 1/58
U.S. Cl. 96—49
9 Claims

ABSTRACT OF THE DISCLOSURE

Diazotype compositions including a light-sensitive diazonium salt and a coupler compound that can react with the diazonium salt to form an azo dye, wherein the coupler is a 3'-hydroxy-2'-naphthoylurea, such as those wherein the terminal urea nitrogen atom (i.e., the nitrogen not bonded to the naphthoyl group) is substituted with members like hydrogen atoms, aryl groups, alkyl groups, or atoms which, in combination with the nitrogen atom, form 5 to 6-membered heterocyclic groups like morpholino, piperidino or pyrrolidino, produce blue dyes of increased red light opacity on development with base. Optionally, a yellow dye-forming coupler can be included in the composition to promote the formation of neutral hue (black line) images. The diazotype compositions of this type can be carried on a support to prepare composite diazotype photographic elements.

---

This invention pertains to photography, to new azo-dye-forming couplers and to light-sensitive diazotype compositions and photographic elements containing such couplers.

Two-component, light-sensitive diazotype compositions generally include at least one light-sensitive, diazonium salt, preferably acid-stabilized to reduce premature coupling of the salt and coupler, and at least one coupler compound which can react with the diazonium salt, typically in the presence of a base to form an azo dye. In addition, there can be present various other additives, such as image enhancers, ultraviolet absorbers as well as additional known addenda. These diazotype compositions or azo-dye forming systems have been employed as duplicating media. Their use typically involves an imagewise exposure to activating radiation, e.g. actinic light, through an original, whereby the transmitted light decomposes the diazonium salt. After exposure, the film is usually treated with a base such as aqueous ammonia vapor to promote coupling of the undecomposed diazonium salt and coupler compound and develop an azo dye in the unexposed areas. This provides a positive photographic image corresponding to that of the original.

It is desirable, for many purposes, to have an azo dye of neutral hue produced in image areas. This is generally obtained by including one or more blue dye-forming couplers and one or more yellow dye-forming couplers in the diazotype composition. Ideally, when treated with a basic developer, e.g. aqueous ammonia vapors, ammonia gas, aqueous nitrogen bases, etc., the couplers form optically balancing amounts of blue and yellow dyes such that the image appears black or grey in color.

Previously, however, it has been difficult to obtain the desired optical neutrality due to a limiting property of existing blue couplers. Blue dye-forming couplers desirably yield dyes which absorb light in the upper portion of the visible spectrum, but the blue dyes derived from known couplers have been characterized by inadequate absorption in the longest visible wavelengths, the red light region of the spectrum. It is noted that this shortcoming is particularly prominent when the images are viewed under red-rich tungsten illumination. This problem is further complicated in that certain diazonium salts are less able to form red absorbing azo dyes when reacted with conventional blue dye-forming couplers. Generally, the diazonium salts that present the greatest problem are those of high light-sensitivity. It is this very type of diazonium salt which is most advantageous for use in the high speed diazotype compositions that are extremely useful for rapid duplicating operations.

As an example of this difference in dye-forming ability, when reacted with 3-hydroxy-2-naphthanilide, the lower speed diazonium salt 4-diethylaminobenzenediazonium fluoroborate produces a blue dye having an absorption maximum 19 nm. higher than that of the dye produced when the higher speed diazonium salt, 2,5-diethoxy-4-morpholinobenzenediazonium fluoroborate, is reacted with the same coupler.

As well as producing dyes of low red opacity, many naphthoic acid amide couplers absorb light in the ultraviolet portion of the spectrum. When these couplers are in the presence of a diazonium salt, such as in a diazotype composition, they compete with the light-sensitive diazonium salt for absorption of exposing actinic rays and thereby cause an undesirable reduction in the photographic speed of the diazotype composition.

Accordingly, it is an object of this invention to produce new diazotype compositions and elements.

It is another object of this invention to provide new naphthoic acid amide blue azo dye-forming couplers of decreased ultraviolet opacity that produce dyes of increased red light opacity.

It is still another object of the present invention to provide new two-component diazotype compositions and elements that produce neutral hue azo dye images.

Still another object of this invention is to provide new photographic processes for the preparation of azo dye images.

The objects of this invention are accomplished, in one aspect, with improved two-component diazotype compositions and elements that include a diazonium salt and a 3'-hydroxy-2'-naphthoylurea blue dye-forming coupler. Optionally, a yellow dye-forming coupler can be included where black line images are desired. The diazotype compositions and elements of this invention can also be used in new photographic processes.

In a preferred embodiment, the present invention relates to two-component diazotype compositions that contain a light-sensitive diazonium salt, preferably a p-aminobenzenediazonium salt, and a 3'-hydroxy-2'-naphthoylurea coupler having the following formula:

(I) 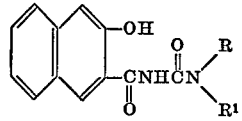

wherein each of R and R¹, when taken alone, represents either a hydrogen atom, an alkyl group (preferably a lower alkyl group having from 1 to 4 carbon atoms) or an aryl group (preferably phenyl) and R and $R^1$, when taken together, represent the atoms necessary to complete a divalent group having the formula:

wherein $b$ represents an integer having a value of 0 or 1, each of $a$ and $c$ represents a positive integer and the sum of $a$, $b$ and $c$ is 5 when $b$ is 1 and 4 or 5 when $b$ is 0.

As used herein, the term alkyl group refers to straight and branched chain alkyl groups having from 1 to about 18 carbon atoms in the chain used as a basis for the nomenclature for the alkyl group. Included within such alkyl groups are substituted and unsubstituted groups such as methyl, halomethyl, ethyl, hydroxyethyl, propyl, n-butyl, isobutyl, pentyl, hexyl, heptyl, n-octyl, tert-octyl, nonyl, decyl, undecyl, dodecyl, tetradecyl, pentadecyl, hexadecyl, heptadecyl, octadecyl and the like. Aryl groups, as presently defined, include unsaturated carbocyclic groups having from 6 to 14 carbon atoms in a mono or polycyclic fused ring nucleus and preferably phenyl and naphthyl.

Couplers of this type can be prepared by convenient techniques such as those described in Abrahart, J. Chem. Society, (1938), pp. 424–426, especially Equation 1 as described therein. Another useful technique is described in Clanson-Kaas and G. Jansen, Acta, Chem. Scand., 20 (1966), p. 2010. Still another preparation is demonstrated by the following equation.

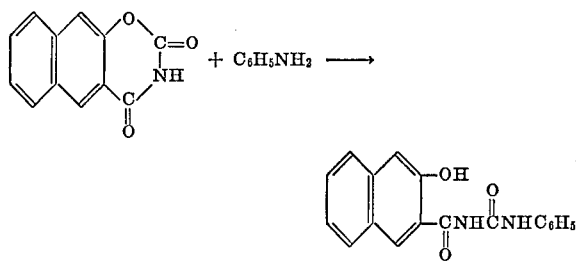

Particularly useful such couplers of the present type include those of Formula I above wherein, in that formula, the group

represents either

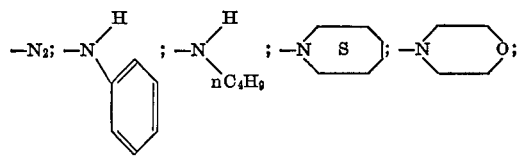

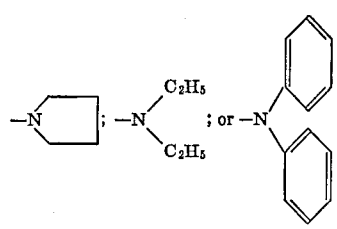

as well as similar chemical groups wherein the alkyl or aryl groups can be additionally substituted with alkyl groups, halogen atoms, hydroxyl groups, etc.

As mentioned herein, the couplers are advantageously combined with a light-sensitive diazonium salt to prepare a diazo-type composition. Generally, diazonium salts are sensitive to actinic rays including ultraviolet light, etc.

Useful diazonium salts include benzenediazonium salts such as those having the formula:

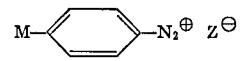

wherein

M is either:
(1) an aryl group,
(2) an amino group including substituted amino group such as those having the formula

wherein $R^2$ and $R^3$ are the same or different and can be a hydrogen atom, an alkyl group or an aryl group such as phenyl or naphthyl, or
(3) an alkyl or aryl thioether group, and $Z^\ominus$ is an acid anion.

These compounds can also be substituted on one or more of the nuclear benzene carbons with, for example, at least one of either a halogen atom, an alkyl group, an alkoxy group, an acyl group, a carbamyl group, a carboxyl group or a nitro group.

Particularly useful diazonium salts include p-aminobenzene diazonium salts having the above formula wherein M is either an amino group including substituted amino groups and diazonium salts wherein M is a thioether group as described above, and wherein the benzene nucleus is unsubstituted or substituted in at least one of the 2-position and the 5-position with either an alkyl group, an alkoxy group or a halogen atom. This class of useful diazonium salts can be represented by the formula:

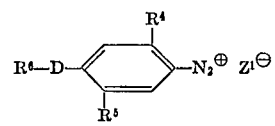

wherein:

(1) D is either a sulfur atom or a radical having the formula $NR^7$,
(2) $R^6$, when taken alone, is either a hydrogen atom when D is $NR^7$, or a lower alkyl group having from 1 to 4 carbon atoms, a lower alkoxy group having from 1 to 4 carbon atoms, an acyl group having the formula

wherein T is either an aryl group or an alkyl group as described elsewhere herein, or a phenyl group when D is either a sulfur atom or $NR^7$,
(3) $R^7$, when taken alone, is either a hydrogen atom, a lower alkyl group or a lower alkoxy group,
(4) $R^6$ and $R^7$, when taken together, complete a divalent group having the formula:

wherein $b$ is an integer having a value of 0 or 1, each of $a$ and $c$ is a positive integer, and the sum of $a$, $b$ and $c$ is 5,
(5) $R^4$ and $R^5$ are each either a hydrogen atom, a halogen atom, a lower alkyl group (preferably methyl or ethyl) or a lower alkoxy group (preferably methoxy or ethoxy), and
(6) $Z^{1\ominus}$ is an acid anion.

Preferred p-aminobenzene diazonium salts include substituted aminobenzene diazonium salts having the formula:

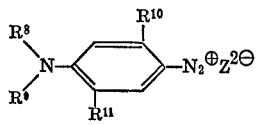

wherein:

(1) each of $R^8$ and $R^9$, when taken alone, is a lower alkyl group,
(2) $R^8$ and $R^9$, when taken together, are the number of carbon and hetero oxygen atoms necessary to complete a morpholino group,
(3) each of $R^{10}$ and $R^{11}$ is a hydrogen atom, a halogen atom, a lower alkyl group or a lower alkoxy group, and
(4) $Z^{\ominus}$ is either a chlorozincate anion, a fluoroborate (tetrafluoroborate) anion, a sulfate anion, a phosphate anion, or a chlorostannate anion.

The most preferred benzene diazonium salts are the fluoroborate salts wherein:

(1) $R^{10}$ and $R^{11}$ are alkoxy groups when $R^8$ and $R^9$ complete a morpholino group, and
(2) $R^{10}$ and $R^{11}$ are each a hydrogen atom when $R^8$ and $R^9$ are each a lower alkyl group.

Illustrative diazonium salts include such compounds as the salts of 4-diazo-2,5-dimethoxybiphenyl;
4-diazo-2,5,4'-triethoxybiphenyl;
1-diazo-4-dimethylaminobenzene;
1-diazo-4-(diethylamino)benzene;
1-diazo-4-[bis(hydroxypropyl)amino]benzene;
1-diazo-4-(N-methyl-N-allylamino)benzene;
1-diazo-4-(diamylamino)benzene;
1-diazo-4-(oxazolidino)benzene;
1-diazo-4-(cyclohexylamino)benzene;
1-diazo-4-(9-carbazolyl)benzene;
1-diazo-4-(dihydroxyethylamino)-3-methylbenzene;
1-diazo-4-dimethylamino-3-methylbenzene;
1-diazo-2-methyl-4-(N-methyl-N-hydroxypropylamino)benzene;
1-diazo-4-dimethylamino-3-ethoxybenzene;
1-diazo-4-diethylamino-3-chlorobenzene;
1-diazo-2-carboxy-4-dimethylaminobenzene;
1-diazo-3-(2-hydroxyethoxy)-4-pyrrolidinobenzene;
1-diazo-2,5-diethoxy-4-acetoxyaminobenzene;
1-diazo-4-methylamino-3-ethoxy-6-chlorobenzene;
1-diazo-2,5-dichloro-4-benzylaminobenzene;
1-diazo-4-phenylaminobenzene;
1-diazo-4-morpholinobenzene;
1-diazo-4-morpholino-3-methoxybenzene;
1-diazo-4-morpholino-2,5-dimethoxybenzene;
1-diazo-4-morpholino-2-ethoxy-5-methoxybenzene;
1-diazo-4-morpholino-2,5-dibutoxybenzene;
1-diazo-2,5-diethoxy-4-benzoylaminobenzene;
1-diazo-2,5-dibutoxy-4-benzoylaminobenzene;
1-diazo-4-ethylmercapto-2,5-diethoxybenzene;
1-diazo-4-tolylmercapto-2,5-diethoxybenzene and the like, as well as mixtures thereof.

As previously mentioned, the blue dye-forming couplers are desirably used in combination with yellow dye-forming couplers such as the types described in Kosar, Light-Sensitive Systems, John Wiley and Sons, Inc., New York (1965), pp. 220–248. Especially desirable yellow dye-forming couplers include 2,5-disubstituted phenols such as those having the formula:

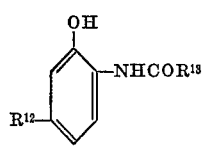

wherein $R^{12}$ represents either an alkyl group, preferably having from 1 to 8 carbon atoms, an alkoxy group, preferably having from 1 to 8 carbon atoms, or a phenyl group, and $R^{13}$ represents either an alkyl group, or an aryl group like phenyl or naphthyl. Preferred 2,5-disubstituted phenols include such compounds as 2-acetamido-5-methylphenol
2-(1',1',1'-trifluoroacetamido)-5-methylphenol
2-acetamido-5-ethylphenol
2-propionoylamido-5-methylphenol
2-hexanoylamido-5-propylphenol
2-octanoylamido-5-phenylphenol
2-(2'-phenylacetamido)-5-methylphenol
2-(2'-phenylacetamido)-5-n-hexylphenol
2-(6'-phenylhexanoylamido)-5-ethylphenol
2-acetamido-5-ethoxyphenol
2-benxoylamido-5-ethylphenol
2-benzoylamido-5-amyloxyphenol
2-acetamido-5-hexyloxyphenol.

Other advantageous yellow couplers include the 1-hydroxy-2-naphthamides such as those having the formula:

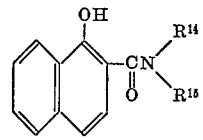

wherein each of $R^{14}$ and $R^{15}$, when taken alone, represents either a hydrogen atom, an alkyl group, a cycloalkyl group having from 4 to 6 carbon atoms, or an aryl group and wherein $R^{14}$ and $R^{15}$, when taken together, represent the carbon and oxygen atoms necessary to complete a piperidino group or morpholino group. Particularly useful compounds of this type include 1-hydroxy-2-naphthamide,
N-methyl-1-hydroxy-2-naphthamide,
N-butyl-1-hydroxy-2-naphthamide,
N-octadecyl-1-hydroxy-2-naphthamide,
N-phenyl-1-hydroxy-2-naphthamide,
N-methyl-N-phenyl-1-hydroxy-2-naphthamide,
N-(2'-tetradecyloxyphenyl)-1-hydroxy-2-naphthamide,
N-[4-(2,4-di-tert-amylphenoxy)butyl]-1-hydroxy-2-naphthamide,
1-hydroxy-2-naphthopiperidide,
N-(3',5'-dicarboxyphenyl)-N-ethyl-1-hydroxy-2-naphthamide,
N,N-dibenzyl-1-hydroxy-2-naphthamide,
N-(2'-chlorophenyl)-1-hydroxy-2-naphthamide,
N-(4'-methoxyphenyl)-1-hydroxy-2-naphthamide,
1-hydroxy-2-naphthopiperizide,
1',3'-bis(1-hydroxy-2-naphthamidobenzene).

Between the constituent coupler compounds in a diazotype composition of the present type, the blue dye-forming coupler compounds are generally admixed with the yellow dye-forming coupler compounds in a molar ratio between total blue coupler and total yellow coupler of from 3:1 to 1:3 respectively, with a molar ratio of from 1.8:1 to 1:1.8 being preferred in most formulations. Most preferred is a ratio of about 1:1.5, e.g., 1:1.4 to 1.6, between blue dye-forming coupler or couplers and yellow dye-forming coupler or couplers, but wider variations than those described herein can be advantageous for particular formulations.

To prepare a light-sensitive diazotype composition, the diazonium salt is generally admixed with a stoichiometric excess amount of the coupler compounds. Typically a slight molar excess of coupler (e.g., from about 10% excess up to about 2:1) is used with the diazonium salt to insure maximum dye formation in the final image.

For ease of coating and stability of the coated layer, the diazotype composition is generally dispersed in a polymeric matrix such as those described hereinbelow, conventionally in an amount of from about 2 to about 40 parts by weight per 100 parts of matrix polymer.

In addition to the dye-forming components, the diazotype composition can contain and usually does contain other additives such as ultraviolet absorbers, stabilizers and the like to advantageously modify its photographic and chemical properties. Acid stabilized diazonium salts can be preferred in certain situations and accordingly, a preferred class of additives includes the known acid stabilizers which operate to prevent premature coupling of the diazonium salt and coupler compound. These acid stabilizers include organic acids such as 5-sulfosalicyclic acid and the like. In general, an organic acid stabilizer is preferably present in all of the diazotype compositions and elements of this invention, with the amount normally varying from about 1 part to about 6, and preferably from about 2 to about 5 parts by weight per 100 parts of polymeric matrix. Additionally, metal salts like zinc chloride can also be present as a development accelerator or a dye brightener, generally in an amount of from about 0.5 to about 1.5 parts by weight per 100 parts of matrix polymer.

Another, and especially desirable, class of additives for diazotype compositions are hindered phenols containing in the 2-position either an alkyl or a cycloalkyl radical and in the 4-position either an alkyl radical, an alkoxy radical, a hydroxyl radical or a thioether radical, which with the hindered phenolic moiety completes a hindered bisthiophenol and more generally a symmetrical bisthiophenol. Such advantageous hindered phenols, which operate to stabilize azo dyes such as those formed by the elements of this invention upon suitable development, are described in detail in U.S. Pat. 3,591,381.

The diazotype compositions, including all supplemental addenda, are typically dispersed in a polymeric matrix or binder when preparing photographic elements, both for ease of coating and physical stability of the resultant light-sensitive layer. Advantageous matrix polymers include a wide variety of hydrophobic film-forming polymeric substances such as, for example, cellulosic compounds like ethyl cellulose, butyl cellulose, as well as cellulose esters like cellulose acetate, cellulose triacetate, cellulose butyrate and cellulose acetate butyrate; vinyl polymers such as poly(vinyl acetate), poly(vinylidene chloride), poly (vinyl butyral), copolymers of vinyl chloride and vinyl acetate, polystyrenes, poly(methyl methacrylate), copolymers of alkylacrylates and acrylic acid, etc.; as well as additional polymers such as polyphenylene oxides, terpolymers of ethylene glycol, isophthalic acid and terephthalic acid, terpolymers of p-cyclohexane dicarboxylic acid, isophthalic acid and cyclohexylenebismethanol, copolymers of p-cyclohexanedicarboxylic acid and 2,2,4,4-tetramethylcyclobutane-1,3-diol, and additional polymers such as, for example, 4,4'-isopropylidenediphenyl-2-hydroxy-1,3-propylene ether.

Photographic elements utilizing the light-sensitive diazotype compositions of this invention are conveniently prepared by coating such a composition onto a support material by means such as immersion, flow coating, whirler coating, brushing, doctor blade coating, hopper coating and the like to prepare a light-sensitive layer.

Advantageous support materials include conventional photographic film base materials like cellulose esters such as cellulose acetate, cellulose triacetate, cellulose acetate butyrate, etc.; poly-α-olefins like polyethylene, polypropylene and polystyrene; polyesters such as poly(ethylene terephthalate); polycarbonates as well as metals such as zinc and aluminum and paper including polyethylene and polypropylene coated papers. Other support materials that are suitably used herein are known in the art.

Coating is typically by solvent coating means, since it offers the potential for rapid, convenient, continuous operation. Coating is effected by first dissolving the photographic image-forming composition in a suitable solvent, along with a matrix polymer if desired. Exemplary matrix polymers are described hereinabove. The coating solution conventionally contains from about 5 to about 20 weight percent solids, and preferably from about 8 to about 15 percent solids.

Wider variations are possible where desired, but the above-mentioned ratios are typical for most conventional preparations. After coating by such means as whirler coating, brushing, doctor blade coating, hopper coating or the like, typically at a wet thickness of from about .001 in. to about .005 in., the coated material is dried to prepare a composite photographic element of this invention.

The present photographic elements can be imagewise exposed and developed to prepare a positive, substantially neutral hue azo dye image corresponding to the original. Exposure is typically to a light source rich in actinic light including ultraviolet rays, such as a mercury arc lamp, a photoflood lamp or the like. Image development is conveniently accomplished by contacting the exposed element with an alkaline medium such as moist ammonia vapors at ambient pressure or high pressure anhydrous ammonia gas, which promotes the reaction of diazonium salt and coupler compound to form an azo dye image. No further image stabilization is necessary.

The following example is included for a further understanding of the invention.

EXAMPLE

Each of seven azo dye-forming couplers, three non-urea types (No. 1–3) and four 2'-hydroxy-3'-naphthoylurea couplers (No. 4–7) is used in combination with each of two diazonium salts, lower speed Diazo II (p-diethylaminobenzenediazonium tetrafluoroborate), and higher speed Diazo III (2,5-diethoxy-4-morpholinobenzenediazonium tetrafluoroborate) to prepare diazotype compositions and photographic elements. Diazotype compositions are prepared as coating solutions containing

|  | Wt. (gms.) |
|---|---|
| p-Diethylaminobenzenediazonium tetrafluoroborate (Diazo II) or | 0.0263 (0.10 mmole). |
| 2,5-diethoxy - 4 - morpholinobenzenediazonium tetrafluoroborate (Diazo III) | 0.0361 (0.10 mmole). |
| Coupler | — (0.12 mmole). |
| 5-sulfosalicyclic acid | 0.040. |
| Cellulose acetate butyrate | 0.91. |
| 2,2-dichloroethane | 5.0. |
| Methanol | 3.0. |

Each diazotype comopsition is doctor blade coated at a wet thickness of .003 inch on a poly(ethylene terephthalate) support and dried to prepare a composite photographic element. Each element is then treated with aqueous ammonia vapors to produce an azo dye. Since no imagewise exposure is used to decompose the diazonium salts, an overall dye image is produced in each case. Using a standard optical densitometer, appropriate absorption data obtained relative to each image dye is summarized in Table I, with maximum absorption wavelength ($\lambda$) in nanometers (nm.) and red light optical density at 675 nm. ($D°_{675}$) being indicated. The optical density at 675 nm. is a normalized density, that being the density at 675 nm. which corresponds to a density of 1.5 for the dye at 550 nm. This normalized density correlates well with visual observations. The extinction coefficient at 365 nm. indicates U.V. opacity of the coupler.

TABLE I

| Number | Structure | Coupler, $\epsilon_{365}$ nm. | Diazo II $\lambda_{max}$ | Diazo II $D°_{675}$ | Diazo III $\lambda_{max}$ | Diazo III $D°_{675}$ |
|---|---|---|---|---|---|---|
| 1 | 2,3-dihydroxynaphthalene (—OH, —OH) | 0 | 525, 587 | 0.57 | 559 | 0.19 |
| 2 | naphthalene with —OH and —CNHCH$_2$CH$_2$OH (=O) | 2,600 | 542, 588 | 0.60 | 569 | 0.37 |
| 3 | naphthalene with —OH and —CNHC$_6$H$_5$ (=O) | 2,800 | 594 | 0.84 | 575 | 0.52 |
| 4 | naphthalene with —OH and —CNHCNH$_2$ (=O, =O) | 1,500 | 602 | 1.20 | 578 | 0.70 |
| 5 | naphthalene with —OH and —CNHCNHC$_6$H$_5$ (=O, =O) | 1,900 | 612 | 1.53 | 587 | 1.01 |
| 6 | naphthalene with —OH and —CNHCNHnC$_4$H$_9$ (=O, =O) | 2,000 | 604 | 1.17 | 581 | 0.72 |
| 7 | naphthalene with —OH and —CNHCN(morpholine) (=O, =O) | 1,650 | 595 | 1.00 | 580 | 0.72 |

From the table, it is demonstrated that the dyes from coupler No. 1 exhibit extremely low optical density at 675 nm. relative to dyes from the urea couplers of the present type (Nos. 4–7). Couplers No. 2 and No. 3 which are naphthoic acid amide derivatives, also yield dyes exhibiting low relative red light opacity. Additionally, couplers No. 2 and No. 3 exhibit high U.V. opacity which inhibits photographic speed of the diazotype composition. The naphthoylurea couplers of the subject type, couplers No. 4, No. 5, No. 6 and No. 7, which are also naphthoic acid amide derivatives, yield dye of increased red light opacity and themselves exhibit a decreased ultraviolet opacity relative to known couplers such as No. 2 and No. 3 in the table.

As well as using the ammonia development process indicated in the above example, a wide range of other processing techniques such as are described in Zollinger, Azo and Diazo Chemistry, Interscience Publishers, New York, 1961; Dinaburg, Photosensitive Diazo Compounds, Focal Press, London, 1964 and Kosar, Light-Sensitive Systems, John Wiley and Sons, New York, 1965, can be used to advantage.

The invention has been described in detail with particular reference to certain preferred embodiments thereof, but it will be understood that variations and modifications can be effected within the spirit and scope of the invention.

What is claimed is:

1. A photographic process for preparing a photographic image comprising imagewise exposing to actinic radiation and subsequently developing in a basic medium to produce an azo dye image in an improved photographic element comprising a support having coated thereon a light-sensitive layer comprising a light-sensitive diazonium salt and a 3'-hydroxy-2'-naphthoylurea coupler having the formula:

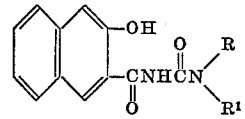

wherein each of R and R$^1$, when taken alone, represents either a hydrogen atom, an alkyl group or an aryl group, and R and R$^1$, when taken together, represent the atoms necessary to complete a divalent group having the formula:

$$-(CH_2)_a-O_b-(CH_2)_c-$$

wherein $b$ represents an integer having a value of 0 or 1, each of $a$ and $c$ represents a positive integer and the sum of $a$, $b$ and $c$ is 5 when $b$ is 1, and either 4 or 5 when $b$ is 0, the ingredients of said coated element being stabilized to prevent pre-coupling until developed in a basic medium.

2. In a light-sensitive diazotype composition comprising a light-sensitive diazonium salt and a coupler compound that can react with the diazonium salt to form an azo dye, the improvement comprising having, as a coupler compound, a 3'-hydroxy-2'-naphthoylurea having the formula:

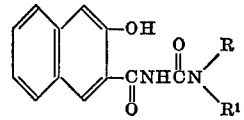

wherein each of R and R¹, when taken alone, represents either a hydrogen atom, an alkyl group or an aryl group, and R and R¹, when taken together, represent the atoms necessary to complete a divalent group having the formula:

wherein $b$ represents an integer having a value of 0 or 1, each of $a$ and $c$ represents a positive integer and the sum of $a$, $b$ and $c$ is 5 when $b$ is 1, and either 4 or 5 when $b$ is 0, the ingredients of said composition being stabilized to prevent pre-coupling until developed in a basic medium.

3. A light-sensitive diazotype composition as described in claim 2 wherein, in the groups represented by each of R and R¹, taken alone,
   (a) the alkyl radical is a lower alkyl radical and
   (b) the aryl radical is a phenyl radical.

4. A light-sensitive diazotype composition as described in claim 2 and also including a yellow dye-forming coupler.

5. In a light-sensitive diazotype composition comprising a light-sensitive diazonium salt and a coupler compound that can react with the diazonium salt to produce an azo dye, the improvement comprising having, as a coupler compound, a 3'-hydroxy-2'-naphthoylurea selected from the group consisting of:
   (a) 3'-hydroxy-2'-naphthoylurea
   (b) 3'-hydroxy-2'-naphthoyl-3-phenylurea
   (c) 3'-hydroxy-2'-naphthoyl-3-methylurea
   (d) 3'-hydroxy-2'-naphthoyl-3-ethylurea
   (e) 3'-hydroxy-2'-naphthoyl-3-propylurea
   (f) 3'-hydroxy-2'-naphthoyl-3-ethyl-3-phenylurea
   (g) 3'-hydroxy-2'-naphthoyl-3-n-butylurea
   (h) 3'-hydroxy-2'-naphthoyl-3-dodecylurea
   (i) 3'-hydroxy-2'-naphthoyl-3-p-tolylurea
   (j) 3'-hydroxy-2'-naphthoyl-3-p-chlorophenylurea
   (k) 3-hydroxy-N-(piperidinocarbonyl)-2-naphthamide.

6. A light-sensitive diazotype composition as described in claim 5 and further including a yellow dye-forming coupler.

7. A photographic element as described in claim 6 wherein, in the group represented by each of R and R¹, taken alone,
   (a) the alkyl radical is a lower alkyl radical and
   (b) the aryl radical is a phenyl radical.

8. In a photographic element comprising a support having coated thereon a light-sensitive layer comprising a light-sensitive diazonium salt and a coupler compound that can react with the diazonium salt to form an azo dye, the improvement comprising having, as a coupler compound, a 3'-hydroxy-2'-naphthoylurea having the formula:

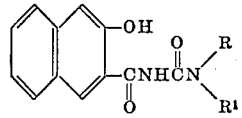

wherein each of R and R¹, when taken alone, represents either a hydrogen atom, an alkyl group or an aryl group, and R and R¹, when taken together, represent the atoms necessary to complete a divalent group having the formula:

wherein $b$ represents an integer having a value of 0 or 1, each of $a$ and $c$ represents a positive integer, and the sum of $a$, $b$ and $c$ is 5 when $b$ is 1, and either 4 or 5 when $b$ is 0, the ingredients of said layer being stabilized to prevent pre-coupling until developed in a basic medium.

9. A photographic element as described in claim 8 and further comprising a yellow dye-forming coupler.

References Cited
UNITED STATES PATENTS

| | | | |
|---|---|---|---|
| 2,196,950 | 4/1940 | Zahn et al. | 96—91 R |
| 2,233,038 | 2/1941 | Sus et al. | 96—91 R |
| 2,298,444 | 10/1942 | Weissberger et al. | 96—91 R |
| 2,467,358 | 4/1949 | Neumann | 96—91 R X |
| 2,970,909 | 2/1961 | Slimowiez | 96—91 R |
| 3,272,627 | 9/1966 | Sus et al. | 96—91 R X |
| 3,367,776 | 2/1968 | Bialczak et al. | 96—91 R X |
| 3,404,005 | 10/1968 | Tobey | 96—91 R |
| 3,406,071 | 10/1968 | Sus | 96—91 R |
| 3,420,665 | 1/1969 | Bialczak | 96—91 R X |
| 3,565,629 | 2/1971 | Usbeck | 96—91 R |

OTHER REFERENCES

Abrahart, J. Chem. Soc., 1938, pp. 424–426.

CHARLES L. BOWERS, JR., Primary Examiner

U.S. Cl. X.R.

96—75, 91 R

PO-1050
(5/69)

UNITED STATES PATENT OFFICE
CERTIFICATE OF CORRECTION

Patent No. 3,761,263    Dated    September 25, 1973

Inventor(s) James C. Fleming and Michael D. Shea

It is certified that error appears in the above-identified patent and that said Letters Patent are hereby corrected as shown below:

Column 6, line 18, that part of the formula reading "benxoylamido" should read ---benzoylamido---.

Column 8, line 56, that part of the formula reading "2,2" should read ---1,2---.

Column 12, line 34, "Slimowiez" should read ---Slimowicz---.

Signed and sealed this 9th day of July 1974.

(SEAL)
Attest:

McCOY M. GIBSON, JR.
Attesting Officer

C. MARSHALL DANN
Commissioner of Patents